(12) United States Patent
Rodriguez et al.

(10) Patent No.: US 10,729,996 B2
(45) Date of Patent: Aug. 4, 2020

(54) DRAIN ASSEMBLY FOR A HOUSING OF A FILTER ASSEMBLY

(71) Applicant: Caterpillar Inc., Deerfield, IL (US)

(72) Inventors: Javier A Rodriguez, Peoria, IL (US); Darrell L Morehouse, III, Arlington, TX (US)

(73) Assignee: Caterpillar Inc., Peoria, IL (US)

( * ) Notice: Subject to any disclaimer, the term of this patent is extended or adjusted under 35 U.S.C. 154(b) by 77 days.

(21) Appl. No.: 16/177,580

(22) Filed: Nov. 1, 2018

(65) Prior Publication Data

US 2020/0139277 A1    May 7, 2020

(51) Int. Cl.
*B01D 35/153* (2006.01)
*B01D 35/30* (2006.01)
(Continued)

(52) U.S. Cl.
CPC .......... *B01D 35/153* (2013.01); *B01D 23/20* (2013.01); *B01D 24/42* (2013.01); *B01D 29/88* (2013.01); *B01D 29/92* (2013.01); *B01D 35/1573* (2013.01); *B01D 35/30* (2013.01); *B01D 36/006* (2013.01); *F16L 5/12* (2013.01); *F16L 29/002* (2013.01); *F16L 37/138* (2013.01); *F16L 55/07* (2013.01); *B01D 17/0214* (2013.01); *B01D 27/08* (2013.01); *B01D 35/147* (2013.01);
(Continued)

(58) Field of Classification Search
CPC ............... B01D 35/153; B01D 35/147; B01D 35/1573; B01D 24/42; B01D 23/20; B01D 36/006; B01D 29/92; B01D 29/88; B01D 35/30; B01D 36/001; B01D 27/08; B01D 17/0214; B01D 35/16; B01D 2201/302; F16L 29/002; F16L 37/138; F16L 55/07; F16L 5/12; F16L 5/10; F16K 27/062; F16K 27/12; C02F 2201/005; Y10T 137/87941
See application file for complete search history.

(56) References Cited

U.S. PATENT DOCUMENTS 3,849,806 A   11/1974  Strickland et al.
4,655,398 A    4/1987  Liggett
(Continued)

FOREIGN PATENT DOCUMENTS

CN    206159734       5/2017
DE    9311759 U1  *  11/1993  ............ F16L 37/098
(Continued)

*Primary Examiner* — Lucas A Stelling
*Assistant Examiner* — Angel Olivera

(57) ABSTRACT

An adapter is provided for fluidly coupling a hose to a housing of a filter assembly having a drain body connected to the housing. The adapter has a retaining cap that is disposed about a central axis and is configured to couple with the drain body. A hose barb body is disposed rotatably about the central axis. The hose barb body has a tapered portion that is configured to receive at least a portion of the drain body therein, and a cylindrical portion that extends from the tapered portion. The cylindrical portion is configured to allow selective coupling of a hose thereon. A retaining collar is disposed about the central axis and has a shoulder that is configured to bear the hose barb body thereon. Multiple resilient tabs upstanding from the shoulder have ends laterally extending away from the central axis for engaging with the retaining cap.

20 Claims, 8 Drawing Sheets

(51) Int. Cl.
  B01D 29/92   (2006.01)
  B01D 24/42   (2006.01)
  B01D 29/88   (2006.01)
  B01D 35/157  (2006.01)
  F16L 37/138  (2006.01)
  F16L 55/07   (2006.01)
  F16L 29/00   (2006.01)
  F16K 27/12   (2006.01)
  F16K 27/06   (2006.01)
  B01D 35/16   (2006.01)
  F16L 5/10    (2006.01)
  B01D 27/08   (2006.01)
  B01D 35/147  (2006.01)
  B01D 24/00   (2006.01)
  B01D 36/00   (2006.01)
  F16L 5/12    (2006.01)
  B01D 17/02   (2006.01)

(52) U.S. Cl.
  CPC ............ *B01D 35/16* (2013.01); *B01D 36/001* (2013.01); *B01D 2201/302* (2013.01); *C02F 2201/005* (2013.01); *F16K 27/062* (2013.01); *F16K 27/12* (2013.01); *F16L 5/10* (2013.01)

(56) References Cited

U.S. PATENT DOCUMENTS

| | | | |
|---|---|---|---|
| 2009/0101595 A1* | 4/2009 | Allott | B01D 35/153 |
| | | | 210/767 |
| 2012/0091051 A1* | 4/2012 | Schweitzer | B01D 36/006 |
| | | | 210/232 |
| 2013/0093180 A1 | 4/2013 | Kury | |
| 2015/0115184 A1* | 4/2015 | Allott | F16L 37/138 |
| | | | 251/148 |
| 2015/0202552 A1 | 7/2015 | Allott et al. | |

FOREIGN PATENT DOCUMENTS

| | | |
|---|---|---|
| EP | 0289188 | 11/1988 |
| JP | 1072916 | 3/1989 |
| JP | 5992230 | 9/2016 |
| WO | 2012018321 | 2/2012 |
| WO | 2016149739 | 9/2016 |

* cited by examiner

DRAIN ASSEMBLY FOR A HOUSING OF A FILTER ASSEMBLY

TECHNICAL FIELD

The present disclosure relates to a filter assembly, and more particularly, to a drain assembly for a housing of a filter assembly.

BACKGROUND

It is well known in the art to provide a drain port to a housing of the filter assembly for fluids, and any contaminants, that may be present in the housing to flow out of the filter assembly via the drain port. Current designs of drain ports may be structured and arranged for permitting a connection of a hose thereon. However, when the hose is in use, there exists a possibility that the hose may kink if the hose is bent while draining out the fluids and/or any contaminants from within the housing of the filter assembly. If kinked, the hose may have a restricted flow of fluid and contaminants therethrough.

To mitigate the possibility of kinking the hose, WO Publication 2016/149739 (hereinafter referred to as "the '739 publication") discloses a filter that includes a filter housing having an inlet at one end and an outlet at an opposite end. The inlet and outlet are provided with respective inlet and outlet pipe sections each of which bear a swivel connector thereon. This swivel connector is L-shaped and forms one of the many components of an elbow section that is used to couple with the inlet or the outlet. However, owing to system design limitations, it is envisioned that the L-shape of the swivel connector would inherently impede the flow of fluids and any contamination out of the filter housing.

Hence, there is a need for an improved drain assembly that prevents kinking of a hose while overcoming the aforementioned drawbacks of system design that are disclosed in conjunction with the '739 publication.

SUMMARY OF THE DISCLOSURE

In an aspect of the present disclosure, an adapter is provided for fluidly coupling a hose to a housing of a filter assembly having a drain body that is connected to a drain port of the housing. The adapter includes a retaining cap that is disposed about a central axis and is configured to couple with the drain body. The retaining cap has an inner wall and an outer wall that is disposed about the inner wall and located in a spaced-apart relation to the inner wall. The inner wall defines multiple resilient fingers that are intermittently spaced from one another and disposed about the central axis. The resilient fingers have ends that extend laterally towards the central axis for capturing therebetween a plurality of protrusions that are located on an outer circumference of the drain body. The outer wall defines a plurality of apertures that are disposed laterally with respect to the central axis. The adapter also includes a hose barb body that is disposed rotatably about the central axis. This hose barb body has a tapered portion that is configured to receive at least a portion of the drain body therein. The tapered portion defines a lip at an end thereof. The lip is disposed proximal to the ends of the resilient fingers of the retaining cap. The hose barb body also has a cylindrical portion that extends from the tapered portion. The cylindrical portion has an outer circumference that is configured to allow selective coupling of a hose thereon. The adapter also includes a retaining collar that is disposed about the central axis. The retaining collar has a shoulder that is disposed proximal to an underside of the lip of the hose barb body. The shoulder is configured to bear the hose barb body thereon. The retaining collar also has multiple resilient tabs that are upstanding from the shoulder. These resilient tabs have ends that laterally extend away from the central axis for engaging with the plurality of apertures defined in the outer wall of the retaining cap.

In another aspect of the present disclosure, a drain assembly for a housing of a filter assembly includes a drain body, a retaining cap, a hose barb body, and a retaining collar. The drain body defines an elongated passageway that is located along a central axis of the drain body. The drain body has a first portion that is disposed about the central axis and configured to couple with the housing. The drain body also has a second portion that extends away from the first portion. The second portion has an outer circumference disposed about the central axis and a plurality of protrusions that extend laterally away from the outer circumference. The retaining cap is coupled to the second portion of the drain body. The retaining cap has an inner wall and an outer wall that is disposed about the inner wall and located in a spaced-apart relation to the inner wall. The inner wall defines a plurality of intermittently spaced resilient fingers that are disposed about the central axis. The plurality of resilient fingers have ends that extend laterally towards the central axis for capturing therebetween the plurality of protrusions located on the outer circumference of the second portion of the drain body. The outer wall defines a plurality of apertures that are disposed laterally with respect to the central axis. The hose barb body is disposed about the central axis and has a tapered portion that is configured to receive the second end of the drain body. The tapered portion defines a lip at an end thereof. The lip is disposed proximal to the ends of the resilient fingers of the retaining cap. The hose barb body also has a cylindrical portion that extends from the tapered portion. The cylindrical portion has an outer circumference that is configured to allow selective coupling of a hose thereon. The retaining collar is disposed about the central axis and has a shoulder that is disposed proximal to an underside of the lip of the hose barb body. The shoulder is configured to bear the hose barb body thereon. The retaining collar also has a plurality of resilient tabs upstanding from the shoulder. These resilient tabs have ends that laterally extend away from the central axis for engaging with the plurality of apertures defined in the outer wall of the retaining cap.

In another aspect, embodiments disclosed herein have also been directed to a filter assembly that includes a housing and employs the drain assembly of the present disclosure.

Other features and aspects of this disclosure will be apparent from the following description and the accompanying drawings.

DETAILED DESCRIPTION

Figure 1:
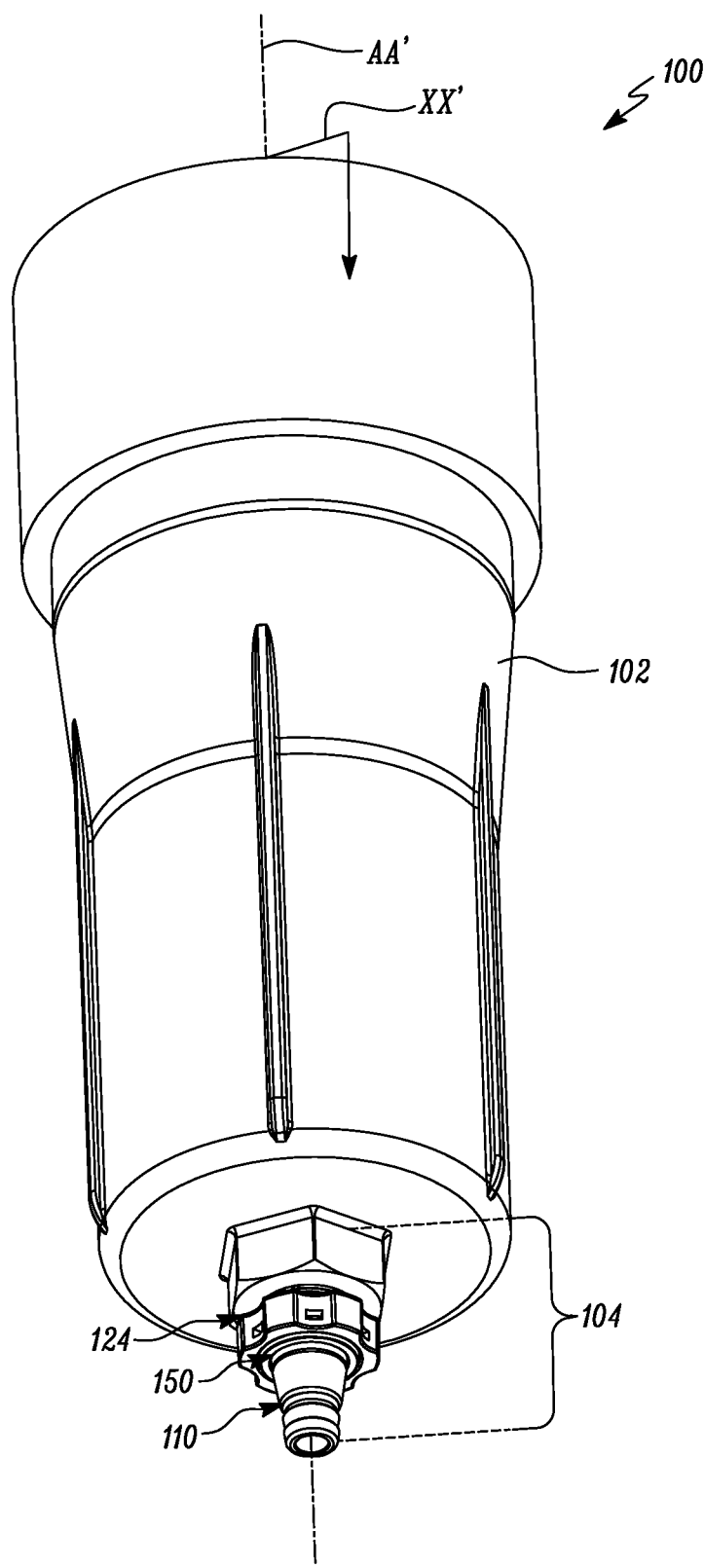
FIG. 1 is a bottom perspective view of a filter assembly showing a housing and a drain assembly in accordance with embodiments of the present disclosure.

Reference numerals appearing in more than one figure indicate the same or corresponding parts in each of them. References to elements in the singular may also be construed to relate to the plural and vice-versa without limiting the scope of the disclosure to the exact number or type of such elements unless set forth explicitly in the appended claims.

FIG. 1 illustrates a filter assembly 100 that can be used to filter contaminants present in a liquid. In an embodiment, the filter assembly 100 disclosed herein is embodied as a diesel fuel filter. However, in other embodiments, the filter assembly 100 may be embodied as a gasoline fuel filter or may be used to filter contaminants from other types of liquids including, but not limited to, oils depending on specific requirements of an application.

Figure 2:
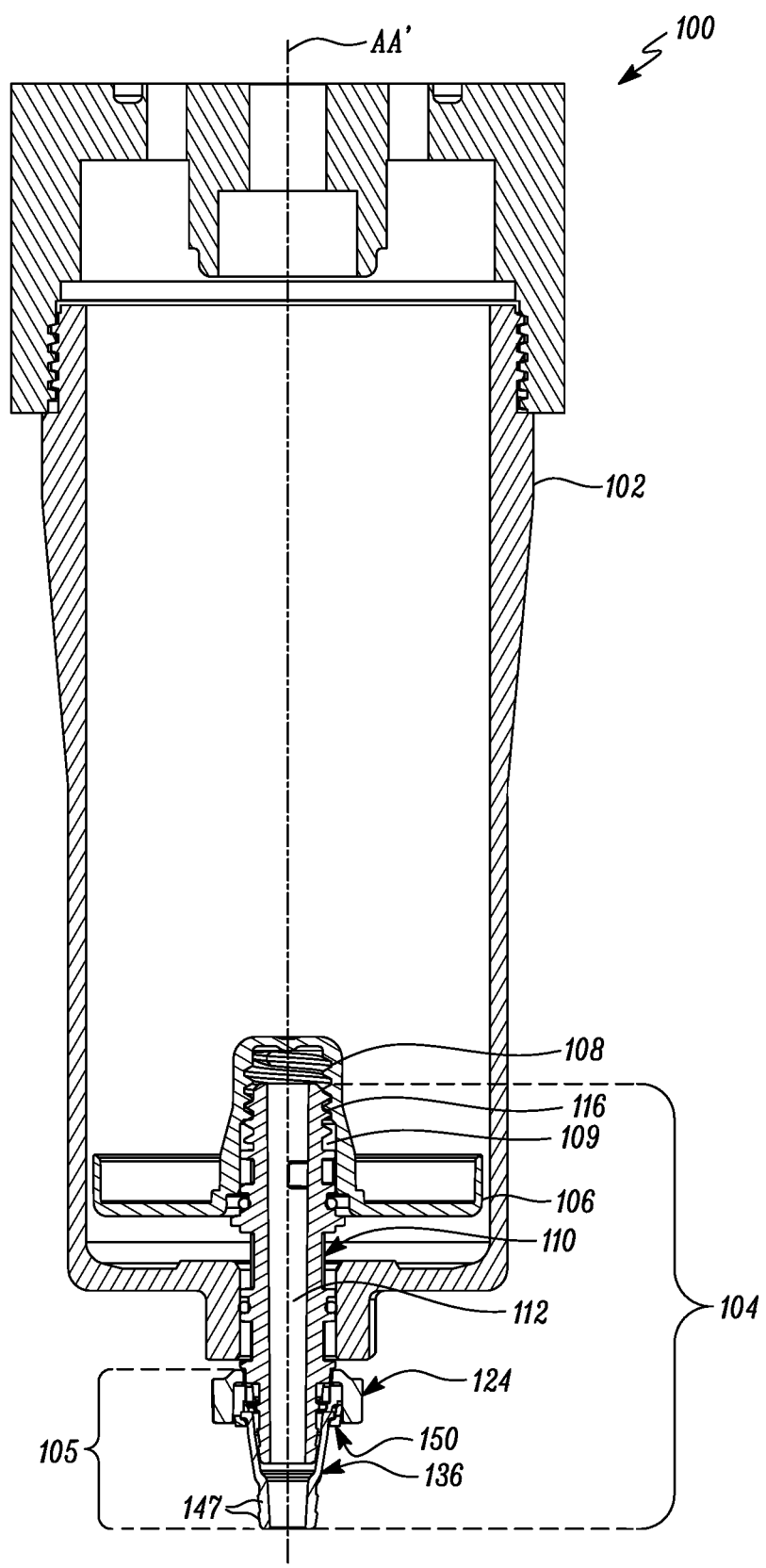
FIG. 2 is a front cross-sectional view of the filter assembly taken along section plane XX' of the view depicted in FIG. 1, in accordance with embodiments of the present disclosure.

As shown in FIGS. 1 and 2, the filter assembly 100 includes a housing 102 and a drain assembly 104. The housing 102 includes an end plate 106 that is positioned within the housing 102. The end plate 106 has a drain port 109 and a threaded receptacle 108 defined about the drain port 109. Explanation to the drain assembly 104 and an inter-relative positioning of its components will now be made in conjunction with FIGS. 2 to 7. Referring to FIG. 2, and as best shown in the view of FIG. 3, the drain assembly 104 includes a drain body 110, and an adapter 105 having a retaining cap 124, a hose barb body 136, and a retaining collar 150.

The drain body 110 defines an elongated passageway 112 that is located along a central axis AA' of the drain body 110. The drain body 110 has a first portion 114 that is disposed about the central axis AA' and configured to couple with the housing 102. In an embodiment as shown best in the views of FIGS. 2 and 3 respectively, the first portion 114 of the drain body 110 defines a threaded region 116 that is structured to engage with the threaded receptacle 108 of the end plate 106. The drain body 110 also has a second portion 118 that extends away from the first portion 114. The second portion 118 has an outer circumference 120 disposed about the central axis AA' and multiple protrusions 122 that extend laterally away from the outer circumference 120.

Figure 3:
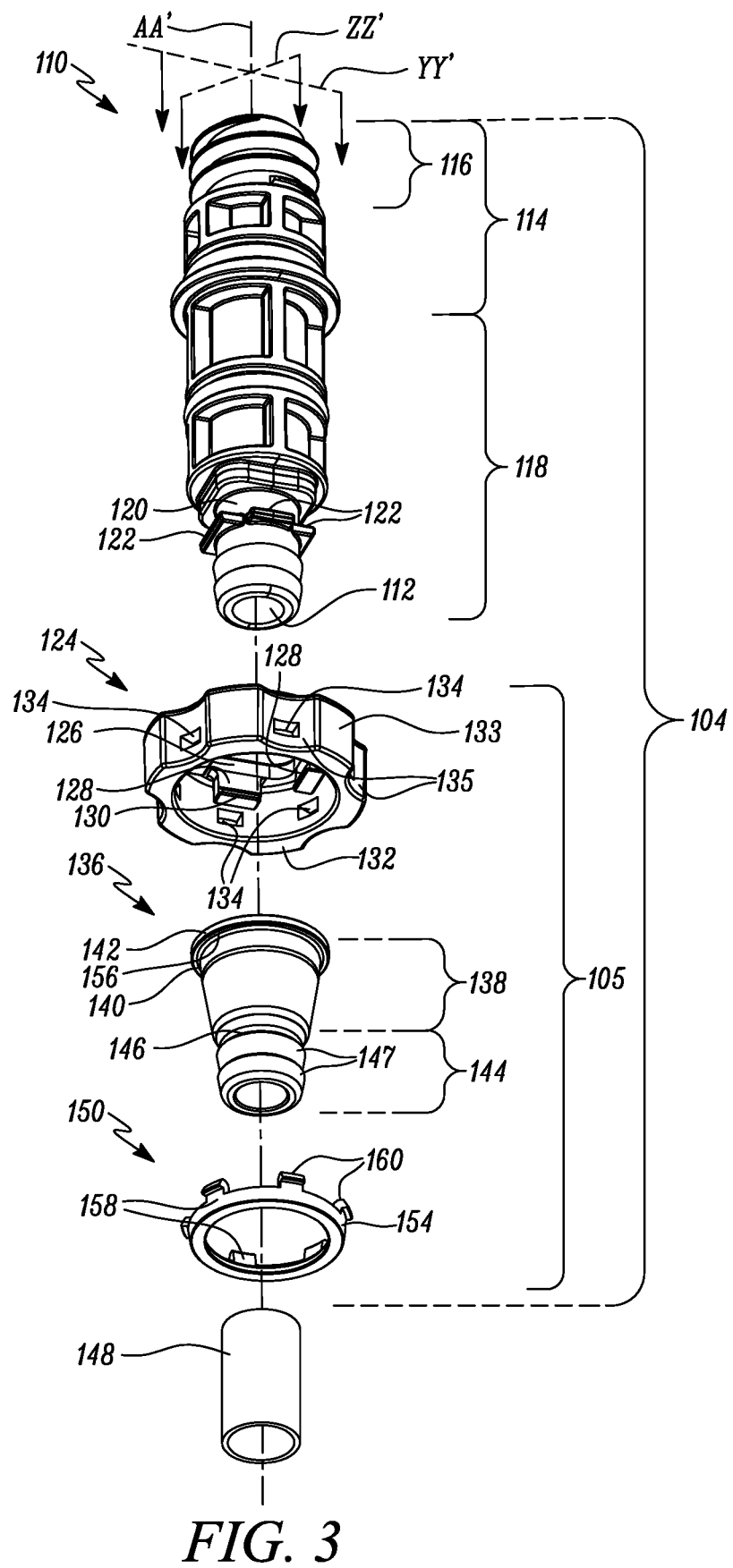
FIG. 3 is an exploded view of the drain assembly showing a drain body, a retaining cap, a hose barb body and a retaining collar, in accordance with embodiments of the present disclosure.
Figure 4:
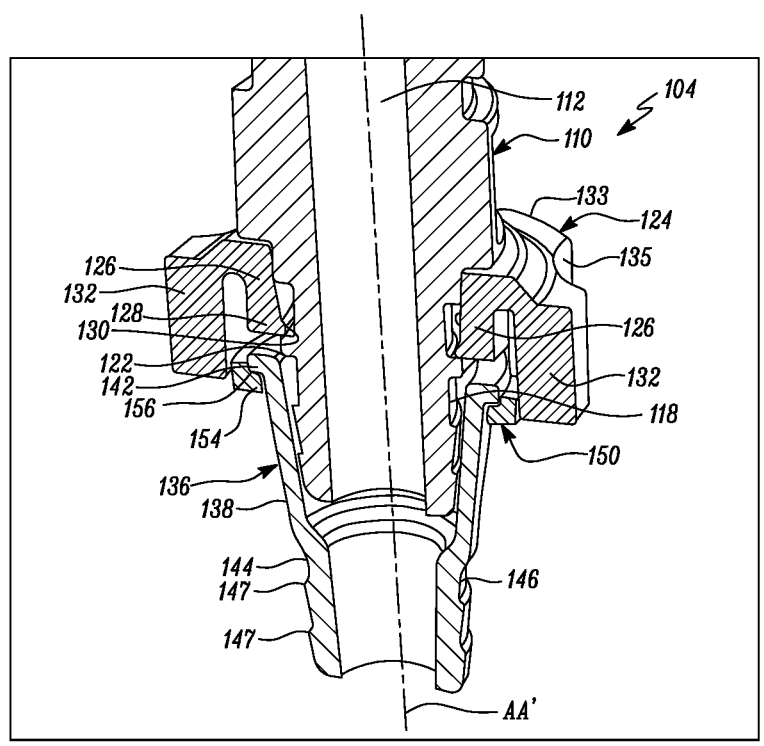
FIG. 4 is a front cross-sectional view of the drain assembly taken along section plane YY' of FIG. 3, in accordance with embodiments of the present disclosure.
Figure 5:
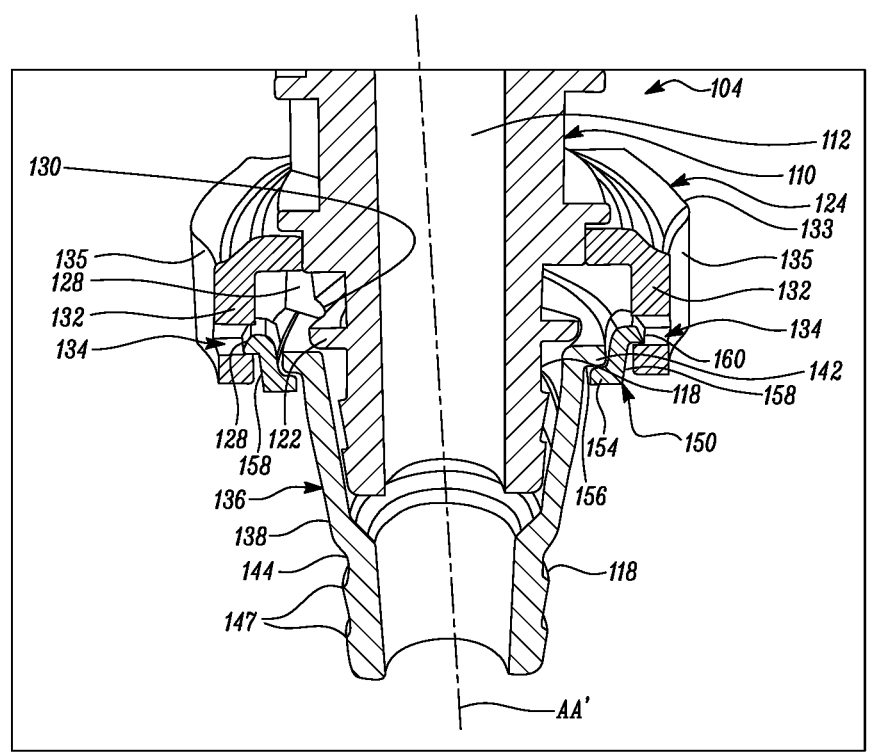
FIG. 5 is a side cross-sectional view of the drain assembly taken along section plane ZZ' of FIG. 3, in accordance with embodiments of the present disclosure.
Figure 6:
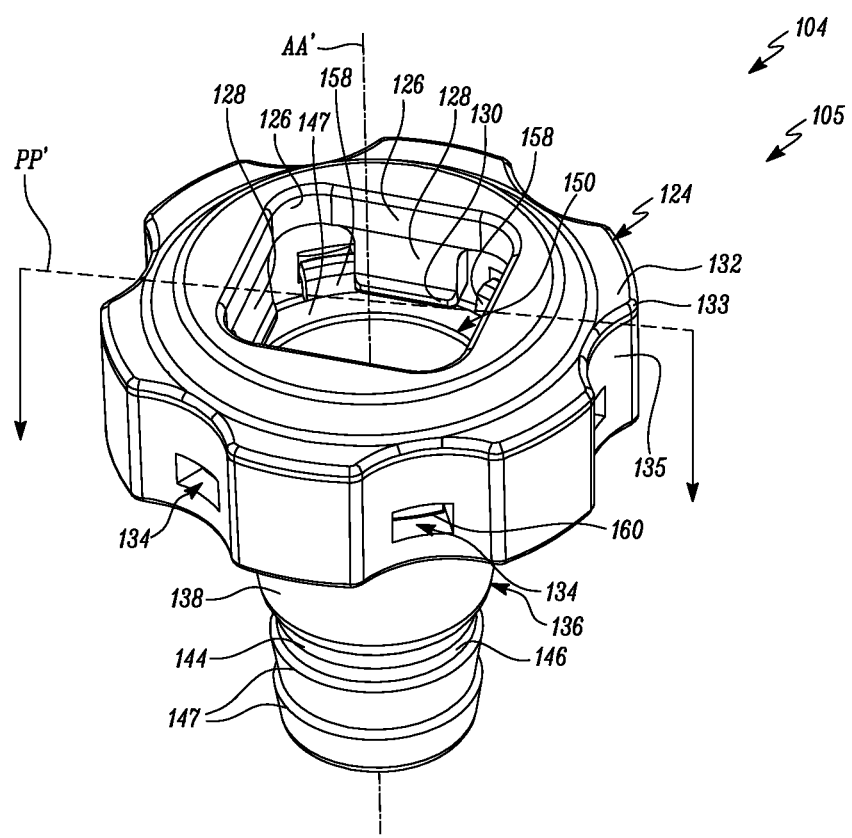
FIG. 6 is a top perspective view of the drain assembly without the drain body, in accordance with embodiments of the present disclosure.
Figure 7:
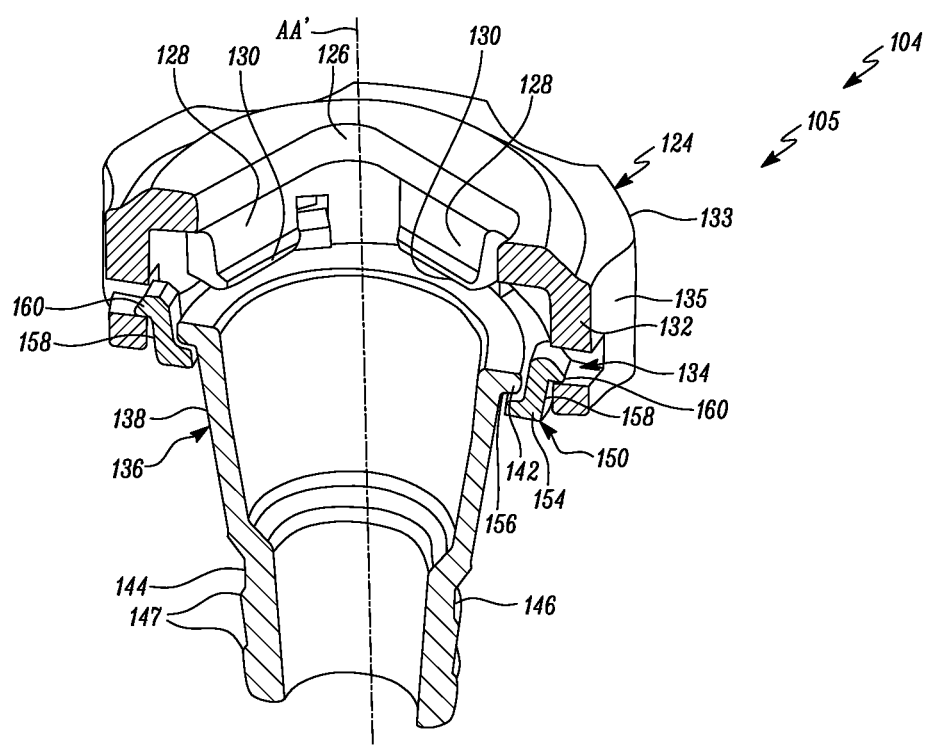
FIG. 7 is a cross-sectional view of the drain assembly without the drain body taken along section plane PP' of FIG. 6, in accordance with embodiments of the present disclosure.

Referring to FIGS. 3, 4, and 5, the retaining cap 124 is configured to couple with the second portion 118 of the drain body 110. The retaining cap 124 has an inner wall 126 and an outer wall 132 that is disposed about the inner wall 126 and located in a spaced-apart relation to the inner wall 126. As best shown in the view of FIGS. 6 and 7, the inner wall 126 defines multiple resilient fingers 128 that are intermittently spaced and disposed about the central axis AA'. With continued reference to FIGS. 6 and 7 and as best shown in the views of FIGS. 4 and 5 respectively, these resilient fingers 128 have ends 130 that extend laterally towards the central axis AA' for capturing therebetween the protrusions 122 that are located on the outer circumference 120 of the second portion 118 of the drain body 110.

Further, as shown in the views of FIGS. 5, 6, and 7 respectively, the outer wall 132 of the retainer cap defines multiple apertures 134 that are disposed laterally with respect to the central axis AA'. Moreover, an outer surface 133 of the outer wall 132 of the retaining cap 124 has multiple recesses 135 defined thereon. These recesses 135 are arranged radially about the central axis AA' and are configured to allow a user to grip the retaining cap 124, for example, to allow ease in handling of the retaining cap 124 during an installation onto, or removal from, the drain body 110 of the drain assembly 104.

Referring to FIGS. 3-7, the hose barb body 136 is rotatably disposed about the central axis AA' and has a tapered portion 138. In an embodiment herein, the tapered portion 138 of the hose barb body 136 has a frustoconical shape. However, in other embodiments, the tapered portion 138 may be configured to exhibit a frustum of a polyhedron, for example, a frustum of a pentagon or a frustum of a hexagon. As shown in the view of FIGS. 3-5, the tapered portion 138 is configured to receive at least a portion i.e., the second portion 118 of the drain body 110.

The tapered portion 138 also defines a lip 142 at an end 140 thereof. As shown best in the views of FIGS. 4-7, this lip 142 is disposed proximal to the ends 130 of the resilient fingers 128 of the retaining cap 124. In an exemplary embodiment, the lip 142 of the hose barb body 136 is located in the range of, for example, 0.1-2.0 millimeters away from the ends 130 of the resilient fingers 128 of the retaining cap 124.

The hose barb body 136 also has a cylindrical portion 144 that extends from the tapered portion 138. Referring to FIG. 3, the cylindrical portion 144 has an outer circumference 146 that is configured to allow selective coupling of a hose 148 thereon. In an embodiment as shown in the views of FIGS. 3-7 respectively, the outer circumference 146 of the cylindrical portion 144 of the hose barb body 136 defines barbs 147 that are configured to allow coupling of the hose 148 thereon.

With continued reference to FIGS. 3-7, the retaining collar 150 is disposed about the central axis AA', and as best shown in the views of FIGS. 4, 5, and 7 respectively, the retaining collar 150 has a shoulder 154 that is disposed proximal to an underside 156 of the lip 142 of the hose barb body 136. The shoulder 154 is configured to bear the hose barb body 136 thereon. The retaining collar 150 also has multiple resilient tabs 158 that are upstanding from the shoulder 154. These resilient tabs 158 have ends 160 that laterally extend away from the central axis AA' for engaging with the apertures 134 that are defined in the outer wall 132 of the retaining cap 124.

In an additional embodiment herein, the drain assembly 104 may further include a seal (not shown). This seal may be disposed between the lip 142 of the hose barb body 136 and the ends 130 of the resilient fingers associated with the retaining cap 124. This seal would be configured to prevent leakage between mating surfaces of the drain assembly 104.

Figures 8, 9:
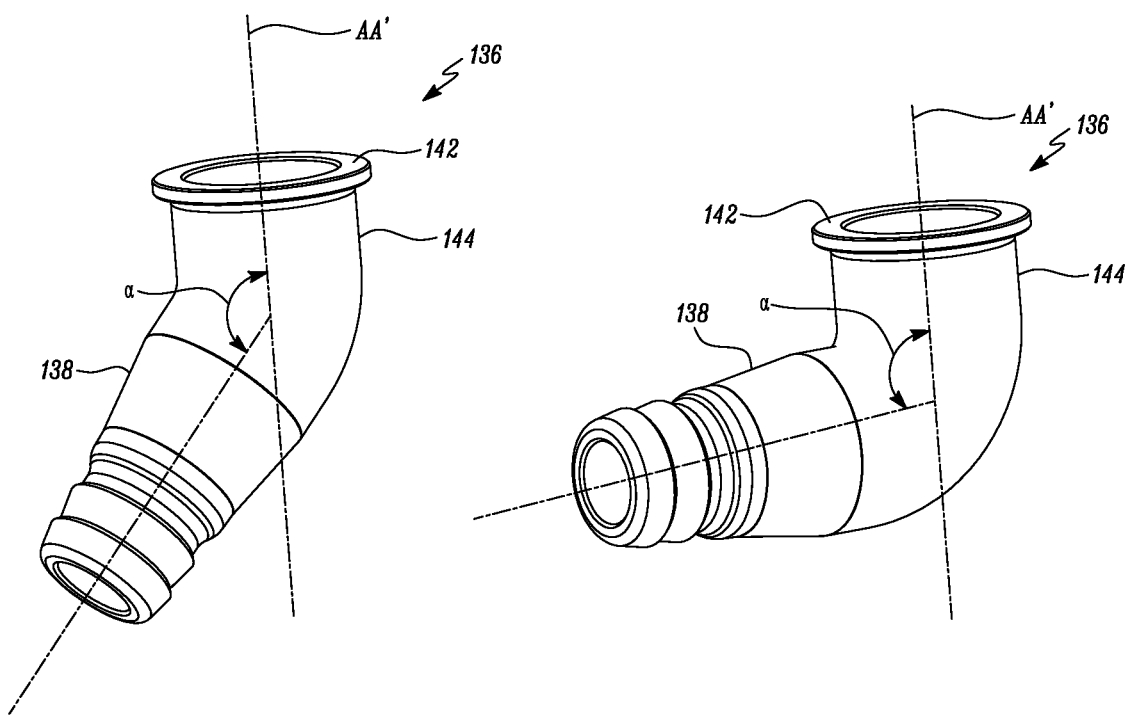
FIGS. 8 and 9 are different configurations of the hose barb body that can be implemented in the drain assembly, in accordance with embodiments of the present disclosure.

In an embodiment as shown in FIGS. 8 and 9, the cylindrical portion 144 of the hose barb body 136 may be disposed at a pre-determined angle α relative to the tapered portion 138 of the hose barb body 136. For instance, in the exemplary view of FIG. 8, this pre-determined angle α may be 135 degrees while in the exemplary view of FIG. 9, the pre-determined angle α may be 90 degrees. Although 135 degrees and 90 degrees have been disclosed herein, any suitable angle may be implemented for disposing the cylindrical portion 144 relative to the tapered portion 138 and facilitating the connection of the hose 148 to the hose barb body 136 depending on specific requirements of an application.

In an embodiment herein, each of the drain body 110, the retaining cap 124, the hose barb body 136, and the retaining collar 150 may be made of a thermoplastic, for example, Polyvinyl Chloride (PVC), Low-density polyethylene (LDPE), or a High-density polyethylene (HDPE). Alternatively, each of the drain body 110, the retaining cap 124, the hose barb body 136, and the retaining collar 150 may be made of a metal, for example, brass, stainless steel, or other metals commonly known to persons skilled in the art.

Various embodiments disclosed herein are to be taken in the illustrative and explanatory sense, and should in no way be construed as limiting of the present disclosure. All joinder references (e.g., associated, provided, connected, coupled and the like) are only used to aid the reader's understanding of the present disclosure, and may not create limitations, particularly as to the position, orientation, or use of the assemblies disclosed herein. Therefore, joinder references, if any, are to be construed broadly. Moreover, such joinder references do not necessarily infer that two elements are directly connected to each other.

Additionally, all numerical terms, such as, but not limited to, "first", "second", or any other ordinary and/or numerical terms, should also be taken only as identifiers, to assist the reader's understanding of the various elements of the present disclosure, and may not create any limitations, particularly as to the order, or preference, of any element relative to or over another element. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

Industrial Applicability

The present disclosure has applicability for use and implementation in providing a drain assembly for a housing of a filter assembly. With use of the present disclosure, manufacturers of filter assemblies can provide aftermarket drain assemblies that can be retrofit onto housings of existing filter assemblies. The adapter 105 disclosed herein includes the hose barb body 136 that is axially secured between the retaining cap 124 and the retaining collar 150 while the hose barb body 136 is capable of rotating about the central axis AA'. This rotatable movement of the hose barb body 136 allows maintenance personnel to rotate the hose 148 that is coupled to the second portion 118 of the hose barb body 136 during service routines.

Further, it is hereby envisioned that by providing the rotatable hose barb body 136, a possibility of kinks in the hose 148 may be reduced as the hose barb body 136 now rotates together with the hose 148 and a separate bending of the hose 148 relative to the hose barb body 136 may no longer be required. Furthermore, it is hereby also envisioned that the substantially axial configuration of the drain body 110, the retaining cap 124, the hose barb body 136, and the retaining collar 150 shown in FIGS. 3 through 7 provides an uninterrupted flow passage to the fluid and any contaminants draining out of the housing 102. Moreover, in embodiments where the drain body 110, the retaining cap 124, the hose barb body 136, and the retaining collar 150 are made of a thermoplastic, these components can be manufactured in a relatively inexpensive manner while also mitigating the possibility of failure from thermal effects.

While aspects of the present disclosure have been particularly shown and described with reference to the embodiments above, it will be understood by those skilled in the art that various additional embodiments may be contemplated by the modification of the disclosed assemblies without departing from the spirit and scope of what is disclosed. Such embodiments should be understood to fall within the scope of the present disclosure as determined based upon the claims and any equivalents thereof.

What is claimed is:

1. An adapter for fluidly coupling a hose to a housing of a filter assembly having a drain body connected to a drain port of the housing, the adapter comprising:
    a retaining cap disposed about a central axis and configured to couple with the drain body, the retaining cap having:
        an inner wall defining a plurality of intermittently spaced resilient fingers disposed about the central axis, the plurality of resilient fingers having ends extending laterally towards the central axis for capturing therebetween a plurality of protrusions located on an outer circumference of the drain body, and
        an outer wall disposed about the inner wall and located in a spaced-apart relation to the inner wall, the outer wall defining a plurality of apertures disposed laterally with respect to the central axis;
    a hose barb body disposed rotatably about the central axis, the hose barb body having:
        a tapered portion configured to receive at least a portion of the drain body therein, the tapered portion defining a lip at an end thereof, the lip disposed proximal to the ends of the resilient fingers of the retaining cap, and
        a cylindrical portion extending from the tapered portion, the cylindrical portion having an outer circumference configured to allow selective coupling of a hose thereon; and
    a retaining collar disposed about the central axis, the retaining collar having:
        a shoulder disposed proximal to an underside of the lip of the hose barb body, the shoulder configured to bear the hose barb body thereon, and
        a plurality of resilient tabs upstanding from the shoulder, the plurality of resilient tabs having ends laterally extending away from the central axis for engaging with the plurality of apertures defined in the outer wall of the retaining cap.

2. The adapter of claim 1, wherein the lip of the hose barb body is positioned in the range of 0.1-2.0 millimeters away from the ends of the resilient fingers of the retaining cap.

3. The adapter of claim 1, wherein the outer wall of the retaining cap has an outer surface defining a plurality of recesses arranged radially about the central axis, the plurality of recesses configured to allow a user to grip the retaining cap.

4. The adapter of claim 1, wherein the tapered portion of the hose barb body has a frustoconical shape.

5. The adapter of claim 1, wherein each of the retaining cap, the hose barb body, and the retaining collar are made from one of a thermoplastic and a metal.

6. The adapter of claim 1, wherein the outer circumference of the cylindrical portion of the hose barb body defines barbs that are configured to allow coupling of the hose thereon.

7. The adapter of claim 1 further comprising a seal disposed between the lip of the hose barb body and the ends of the resilient fingers associated with the retaining cap.

8. A drain assembly for a housing of a filter assembly, the drain assembly comprising:
   a drain body defining an elongated passageway along a central axis of the drain body, the drain body having:
      a first portion disposed about the central axis and configured to couple with the housing, and
      a second portion extending away from the first portion, the second portion having an outer circumference disposed about the central axis and a plurality of protrusions extending laterally away from the outer circumference;
   a retaining cap coupled to the second portion of the drain body, the retaining cap having:
      an inner wall defining a plurality of intermittently spaced resilient fingers disposed about the central axis, the plurality of resilient fingers having ends extending laterally towards the central axis for capturing therebetween the plurality of protrusions located on the outer circumference of the second portion of the drain body, and
      an outer wall disposed about the inner wall and located in a spaced-apart relation to the inner wall, the outer wall defining a plurality of apertures disposed laterally with respect to the central axis;
   a hose barb body rotatably disposed about the central axis, the hose barb body having:
      a tapered portion configured to receive the second end of the drain body, the tapered portion defining a lip at an end thereof, the lip disposed proximal to the ends of the resilient fingers of the retaining cap, and
      a cylindrical portion extending from the tapered portion, the cylindrical portion having an outer circumference configured to allow selective coupling of a hose thereon; and
   a retaining collar disposed about the central axis, the retaining collar having:
      a shoulder disposed proximal to an underside of the lip of the hose barb body, the shoulder configured to bear the hose barb body thereon, and
      a plurality of resilient tabs upstanding from the shoulder, the plurality of resilient tabs having ends laterally extending away from the central axis for engaging with the plurality of apertures defined in the outer wall of the retaining cap.

9. The drain assembly of claim 8, wherein the lip of the hose barb body is positioned in the range of 0.1-2.0 millimeters away from the ends of the resilient fingers of the retaining cap.

10. The drain assembly of claim 8, wherein the first portion of the drain body defines a threaded region structured to engage with a threaded receptacle defined in an end plate positioned within the housing.

11. The drain assembly of claim 8, wherein the outer wall of the retaining cap has an outer surface defining a plurality of recesses arranged radially about the central axis, the plurality of recesses configured to allow a user to grip the retaining cap.

12. The drain assembly of claim 8, wherein the tapered portion of the hose barb body has a frustoconical shape.

13. The drain assembly of claim 8, wherein each of the drain body, the retaining cap, the hose barb body, and the retaining collar are made from one of a thermoplastic and a metal.

14. The drain assembly of claim 8, wherein the outer circumference of the cylindrical portion of the hose barb body defines barbs that are configured to allow coupling of the hose thereon.

15. The drain assembly of claim 8 further comprising a seal disposed between the lip of the hose barb body and the ends of the resilient fingers associated with the retaining cap.

16. A filter assembly comprising:
   a housing;
   a drain body defining an elongated passageway along a central axis of the drain body, the drain body having:
      a first portion disposed about the central axis and configured to couple with the housing, and
      a second portion extending away from the first portion, the second portion having an outer circumference disposed about the central axis and a plurality of protrusions extending laterally away from the outer circumference;
   a retaining cap coupled to the second portion of the drain body, the retaining cap having:
      an inner wall defining a plurality of intermittently spaced resilient fingers disposed about the central axis, the plurality of resilient fingers having ends extending laterally towards the central axis for capturing therebetween the plurality of protrusions located on the outer circumference of the second portion of the drain body, and
      an outer wall disposed about the inner wall and located in a spaced-apart relation to the inner wall, the outer wall defining a plurality of apertures disposed laterally with respect to the central axis;
   a hose barb body rotatably disposed about the central axis, the hose barb body having:
      a tapered portion configured to receive the second end of the drain body, the tapered portion defining a lip at an end thereof, the lip disposed proximal to the ends of the resilient fingers of the retaining cap, and
      a cylindrical portion extending from the tapered portion, the cylindrical portion having an outer circumference configured to allow selective coupling of a hose thereon; and
   a retaining collar disposed about the central axis, the retaining collar having:
      a shoulder disposed proximal to an underside of the lip of the hose barb body, the shoulder configured to bear the hose barb body thereon, and
      a plurality of resilient tabs upstanding from the shoulder, the plurality of resilient tabs having ends laterally extending away from the central axis for engaging with the plurality of apertures defined in the outer wall of the retaining cap.

17. The filter assembly of claim 16, wherein the lip of the hose barb body is positioned in the range of 0.1-2.0 millimeters away from the ends of the resilient fingers of the retaining cap.

18. The filter assembly of claim 16, wherein the housing includes:
   an end plate positioned within the housing, the end plate having a drain port and a threaded receptacle defined about the drain port.

19. The filter assembly of claim 18, wherein the first portion of the drain body defines a threaded region structured to engage with the threaded receptacle of the end plate.

20. The filter assembly of claim 16, wherein the outer circumference of the cylindrical portion of the hose barb body defines barbs that are configured to allow coupling of the hose thereon.

\* \* \* \* \*